Nov. 29, 1966 J. F. MARTIN 3,289,097
EMERGENCY CLOCK PULSE STANDBY SYSTEM
Filed May 11, 1964
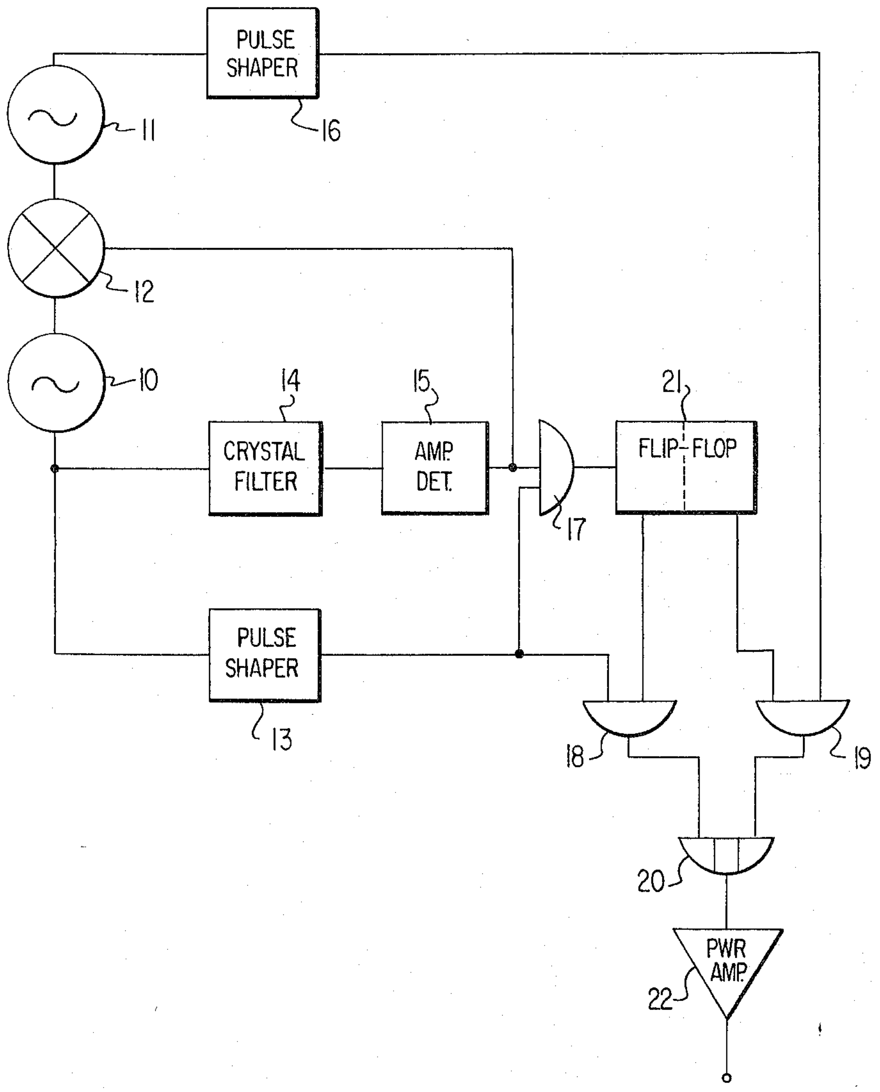
INVENTOR.
JOSEPH F. MARTIN
BY George J. Seligsohn
ATTORNEY 3,289,097
United States Patent Office
Patented Nov. 29, 1966

3,289,097

EMERGENCY CLOCK PULSE STANDBY SYSTEM

Joseph F. Martin, Webster, N.Y., assignor to General Dynamics Corporation, Rochester, N.Y., a corporation of Delaware Filed May 11, 1964, Ser. No. 366,368
3 Claims. (Cl. 331—49)

This invention relates to an emergency standby system for instantaneous automatic switchover from a main source of clock pulses to a standby clock pulse source without loss of continuity or clock pulses.

The clock pulse is utilized, for example, for timing control in time division multiplex systems in which repetitive time frames are broken up into a plurality of successive time slots. Bits of binary information in successive time slots are applied to the input of delay lines providing a delay of substantially one time frame. The output of the delay line is applied to some utilization circuit and/or passed through a recirculation loop back through the input of the delay line. In either case, since a pulse in passing through the delay line has a tendency to be widened, the coupling circuit for applying the output of the delay line to the utilization means as well as the recirculation loops always includes a reclocking "AND" gate, i.e., a gate which produces an output pulse only in response to the simultaneous application thereto of a clock pulse and an output pulse from the delay line.

It is easy to see that the skipping of even one clock pulse can mean the loss of a binary bit being recirculated in the delay line. Since this binary bit may be part of the stored designation number of a particular telephone, for instance, the loss of a single bit will cause an erroneous designation number to be stored, resulting in a breakdown of the entire system.

Thus, it will be seen that it is essential that not even a single clock pulse be skipped when switch-over of clock pulse sources takes place. Since the nominal clock pulse repetition frequency is around one megacycle, the switch-over must take place very quickly and, more important, no momentary discontinuity due to a difference in frequency between the main clock pulse source and the standby clock pulse source at the time of switch-over can be tolerated.

It is therefore an object of this invention to provide a circuit which will automatically switch-over from a main clock pulse generator to a standby clock pulse generator upon the failure of the former, without losing continuity.

It is also an object of this invention to provide a clock pulse circuit consisting of a main and a standby oscillator in which, when the main oscillator fails, the standby oscillator automatically takes over without interruption of the pulse cycle sequency.

Another object of this invention is to provide a circuit which will insure that no discontinuity occurs in the periodicity of the clock pulses generated during switch-over.

Still another object of this invention is to provide a clock pulse generating circuit with an alternate pulse generating means which is automatically and instantaneously substituted into the system upon failure of the main pulse generating source.

A further object of this invention is to provide a circuit for main clock pulse generator failure detecting with automatic switch-over to a standby clock pulse generator of simple design which may be economically produced.

With the foregoing and other objects in view, the invention resides in the following specification and appended claims, certain embodiments and details of which are illustrated in the accompanying drawing, which is a schematic representation of the invention. Each of the blocks here shown represents readily available items well known to those skilled in electronics arts.

The clock pulses are generated by a main oscillator 10 and a standby oscillator 11. These oscillators are synchronized through gate 12. Under normal operation, the main oscillator drives pulse shaper 13, which in turn drives "AND" gates 17 and 18. It also sends a signal to crystal filter 14, which will keep the output of the amplitude detector 15 at ground so long as the oscillator signal is within the bandwidth of the crystal filter. Obviously, filter 14 can be either a bandpass or a band reject filter. What is essential is that when the output of oscillator 10 is within the desired bandwidth, amplitude detector 15 sends ground to gate 17; when the output of oscillator 10 deviates from the desired bandwidth or fails altogether, then amplitude detector 15 sends an enabling signal to gate 17 closing the gate. The normal ground output of the amplitude detector 15 will inhibit "AND" gate 17, hence no output will pass from gate 17 to the flip-flop multivibrator 21, which is a bi-stable oscillator, for example an Eccles-Jordan multivibrator. The flip-flop 21 will be in a steady state and send an enabling pulse to "AND" gate 18, thereby allowing the clock pulses generated at oscillator 10 to pass through gate 18, driving and passing through "OR" gate 20, and power amplifier 22 to the output.

The standby oscillator 11 is synchronized with the main oscillator 10 through gate 12. This oscillator drives pulse shaper 16 which in turn drives "AND" gate 19. However, gate 19 is normally inhibited due to the ground produced by the flip-flop 21. Therefore, the signal from the standby oscillator is blocked, and only the signal from the main oscillator reaches the output.

Abnormal conditions would be caused by the main oscillator's either failing completely or drifting out of the tolerance established by the bandwidth filter 14. In either case, the amplitude detector 15 will provide a negative enabling pulse for gate 17. The trailing edge of the very next pulse out of the pulse shaper 13 will trigger the flip-flop 21, thus transferring the aforementioned ground connection from gate 19 to gate 18, enabling the former and inhibiting the latter. Therefore, oscillator 10 is cut off from the output by the disabling of gate 18, and oscillator 11 is simultaneously connected to the output by the enabling of gate 19. The output of the amplitude detector 15 also inhibits gate 12 under these conditions, thereby disconnecting the synchronous network between the two oscillators. Thus, the faulty main oscillator is removed from the system, while the standby oscillator is substituted without the loss of a single time slot.

In the event that the main oscillator should return to a condition which is within the tolerance set by filter 14, the reverse of the above mentioned change to abnormal operation will occur, and normal operation will resume. When the main oscillator returns to normal operation, so that its frequency is again within the bandwidth of crystal filter 14, the amplitude detector output will return to ground, inhibiting gate 17 and re-establishing synchronization between the oscillators by enabling gate 12. Flip-flop 21 will return to its original state, inhibiting gate 19 and enabling gate 18. Therefore, the clock pulses generated by the main oscillator will again be allowed to pass to gate 20 and the output, while the clock pulses from the standby oscillator will be blocked.

It is to be understood that throughout the specification and appended claims, an open or inhibited gate is one which is electrically open thus preventing the passage of a signal from the gate input to its output. A closed or enabled gate is one which is electrically closed and will allow the passage of a signal through the gate.

It will be readily apparent to those skilled in the art that the present invention provides novel and useful improvements in clock pulse generator failure detecting circuits with automatic switchover to a standby clock pulse generator. The arrangement in types of components utilized within the invention may be subjected to numerous modifications well within the purview of this invention, and applicant intends only to be limited to a liberal interpretation of the specification and appended claims.

Having thus described the invention, what is claimed as new and desired to be secured by Letters Patent is:

1. An emergency standby system for clock pulse generators comprising: a primary oscillator, a standby oscillator, means interconnecting said oscillators for effecting synchronization therebetween, pulse shaping means connected to the output of said oscillators, normally closed gating means connected between said pulse shaping means of said primary oscillator and the system output, normally open gating means connected between said pulse shaping means of said secondary oscillator and said system output, detecting means responsive to said primary oscillator either failing or drifting from a desired band, switching means for selectively enabling said gating means in response to said main oscillator deviating from a desired bandwidth, and means for said detector to break said synchronization upon detection of out of bandwidth conditions.

2. An emergency standby system for clock pulse generators comprising: first and second generating means for generating respectively a first and second series of pulses, means for synchronizing said generating means connected therebetween, normally closed gating means for connecting the output of said first generating means to the system output only when operated from its normally closed condition, normally open gating means for disconnecting the output of said second generating means to said system output only when operated from its normally open condition, frequency sensitive filter means interconnected between the output of said first generator means, and control means, said control means being responsive to variations of the frequency of said first series of pulses beyond a selected range for switching said normally open gating means and said normally closed gating means from their said normal conditions so that said output of said first generating means is connected to said system output when said variations of the frequency of said first series of pulses exist.

3. An emergency standby system for clock pulse generators comprising: first and second generating means for generating, respectively, a first and second series of clock pulses, means for synchronizing said generators connected therebetween, normally closed gating means connecting the output of said first generating means and the system output, normally open gating means connecting the output of said second generating means to said system output, means connected to said primary source for detecting the failure thereof, control means connected to the output of said detector for breaking synchronization between said sources and instantaneously changing the condition of said gating means to allow the signal from said second generator to pass to said system output while the signal from said first generator is blocked without losing continuity.

References Cited by the Examiner

UNITED STATES PATENTS

| | | | |
|---|---|---|---|
| 2,785,317 | 3/1957 | Landberg et al. | 307—64 |
| 2,992,363 | 7/1961 | Grandquist | 331—49 |
| 3,047,816 | 7/1962 | Drake e tal. | 331—49 |
| 3,116,477 | 12/1963 | Bradbury | 331—29 |
| 3,146,405 | 8/1964 | Talmasky et al. | 331—49 |

FOREIGN PATENTS

| | | |
|---|---|---|
| 764,813 | 1/1957 | Great Britain. |

ROY LAKE, *Primary Examiner.*

J. KOMINSKI, *Assistant Examiner.*